US010330909B2

(12) United States Patent
Kern et al.

(10) Patent No.: US 10,330,909 B2
(45) Date of Patent: Jun. 25, 2019

(54) DEVICE FOR MICROSCOPIC EXAMINATION

(71) Applicant: Astrium GmbH, Taufkirchen (DE)

(72) Inventors: Peter Kern, Salem (DE); Rainer Treichel, Uhldingen-Muehlhofen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 457 days.

(21) Appl. No.: 14/092,012

(22) Filed: Nov. 27, 2013

(65) Prior Publication Data

US 2014/0146158 A1    May 29, 2014

(30) Foreign Application Priority Data

Nov. 28, 2012  (DE) .................. 10 2012 111 528

(51) Int. Cl.
| G02B 21/16 | (2006.01) |
| G02B 21/24 | (2006.01) |
| G02B 21/26 | (2006.01) |
| G02B 21/36 | (2006.01) |

(52) U.S. Cl.
CPC ............ *G02B 21/36* (2013.01); *G02B 21/16* (2013.01); *G02B 21/24* (2013.01); *G02B 21/26* (2013.01); *G02B 21/362* (2013.01)

(58) Field of Classification Search
CPC ................................ G02B 21/36; G02B 21/16
USPC ........................................................ 348/79
See application file for complete search history.

(56) References Cited

U.S. PATENT DOCUMENTS

| 1,907,803 | A |   | 5/1933  | Harvey et al. |
| 4,683,120 | A |   | 7/1987  | Meserol et al. |
| 5,006,872 | A |   | 4/1991  | Parker |
| 5,818,637 | A |   | 10/1998 | Hoover et al. |
| 5,930,033 | A | * | 7/1999  | Inoue ............... G01N 15/042 359/234 |
| 6,396,581 | B1 |  | 5/2002  | Hayashi et al. |
| 7,355,698 | B2 | * | 4/2008  | Shah ................ G01N 21/253 356/246 |
| 8,144,189 | B2 |  | 3/2012  | Fujiwara |

(Continued)

FOREIGN PATENT DOCUMENTS

| CN | 101529304 A |   | 9/2009 |             |
| DE | 8700101 U1  | * | 2/1987 | ........... G02B 21/24 |

(Continued)

OTHER PUBLICATIONS

Search Report dated Feb. 19, 2014 in the corresponding European Application No. 13192538.0 (partial English translation attached).

(Continued)

*Primary Examiner* — Richard A Hansell, Jr.
(74) *Attorney, Agent, or Firm* — Posz Law Group, PLC

(57) ABSTRACT

A device for microscopic examination includes an image output unit, at least two image input units, which are arranged in a spatially distributed manner and which have different sample receiving regions, at least one object carrier unit which supports at least one sample, in particular at least one biological sample, and includes a coupling unit, which couples the image output unit and one of the at least two image input units optically to form a microscope unit.

19 Claims, 4 Drawing Sheets

(56) References Cited

U.S. PATENT DOCUMENTS

Figure 1:
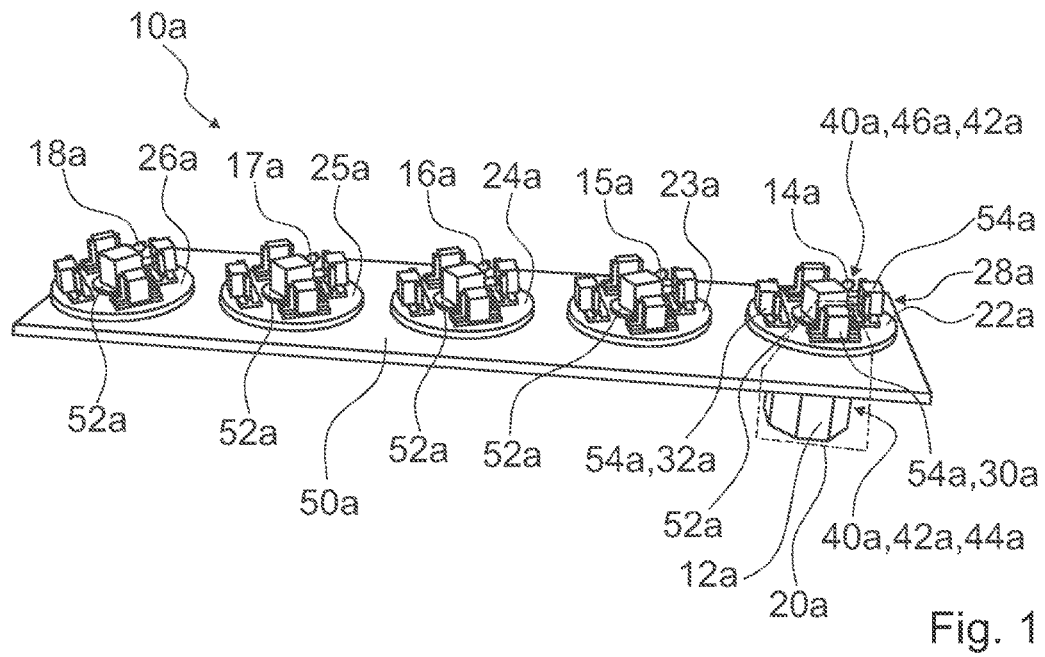

| | | | |
|---|---|---|---|
| 8,164,828 B2* | 4/2012 | Ikeda | G01N 21/07 359/368 |
| 2002/0060842 A1* | 5/2002 | Ogino | G02B 21/18 359/368 |
| 2002/0067543 A1 | 6/2002 | Inoue et al. | |
| 2005/0084175 A1* | 4/2005 | Olszak | G06K 9/00134 382/284 |
| 2010/0027110 A1* | 2/2010 | Ikeda | G01N 21/07 359/385 |
| 2010/0085429 A1* | 4/2010 | Terje | G01N 21/01 348/135 |
| 2010/0141751 A1* | 6/2010 | Uchida | G02B 21/365 348/79 |
| 2011/0001036 A1* | 1/2011 | Stallinga | G02B 21/0032 250/208.1 |
| 2012/0001069 A1* | 1/2012 | Kashihara | G02B 21/0004 250/310 |
| 2012/0001070 A1* | 1/2012 | Takagi | G02B 21/0004 250/310 |
| 2012/0300053 A1* | 11/2012 | Kono | G02B 21/24 348/79 |
| 2012/0307223 A1* | 12/2012 | Van Zwet | G03F 7/70275 355/67 |
| 2013/0076888 A1* | 3/2013 | Hibino | G02B 21/025 348/79 |
| 2013/0229663 A1* | 9/2013 | Yang | A61B 5/0062 356/497 |

FOREIGN PATENT DOCUMENTS

| | | | |
|---|---|---|---|
| DE | 8700101 U1 * | 2/1987 | G02B 21/24 |
| DE | 87 00 101.2 U1 | 4/1987 | |
| DE | 8700101 U1 * | 4/1987 | G02B 21/24 |
| DE | 10 2008 030 349 A1 | 1/2009 | |
| DE | 600 38 403 T2 | 4/2009 | |
| EP | 1 630 586 A1 | 3/2006 | |
| EP | 2 363 742 A1 | 9/2011 | |
| JP | 2004-361485 A | 12/2004 | |
| JP | 2005-010258 A | 1/2005 | |
| JP | 2005-070571 A | 3/2005 | |
| WO | 2008/050254 A1 | 5/2008 | |
| WO | WO-2008050254 A1 * | 5/2008 | G02B 21/0032 |
| WO | WO 2008050254 A1 * | 5/2008 | G02B 21/0032 |
| WO | 2008/078475 A1 | 7/2008 | |
| WO | 2010/118541 A1 | 10/2010 | |
| WO | WO-2010118541 A1 * | 10/2010 | G01N 21/6452 |
| WO | WO 2010118541 A1 * | 10/2010 | G01N 21/6452 |
| WO | WO 2011143121 A2 * | 11/2011 | A61B 5/0062 |
| WO | WO-2011143121 A2 * | 11/2011 | A61B 5/0062 |

OTHER PUBLICATIONS

German Search Report dated Apr. 5, 2013, 2013 issued in the corresponding DE patent application No. 10 2012 111 528.1.

Friedrich et al., "The slow rotating centrifuge microscope NIZEMI—A versatile instrument for terrestrial hypergravity and space microgravity research in biology and materials science," Journal of Biotechnology 47, 1996, pp. 225-238.

Extended European Search Report dated May 27, 2014 issued in corresponding EP patent application No. 13192538.0 (and partial English translation).

Office Action dated May 12, 2015 issued in corresponding JP patent application No. 2013-239720 (and English translation).

German Search Report dated Apr. 5, 2012 issued in the corresponding DE patent application No. 10 2012 111 528.1 (partial English translation only).

Office Action dated Sep. 14, 2015 in the corresponding CN application No. 201310614665.7 (with English summary attached).

Office Action dated Jan. 7, 2016 in the corresponding CA application No. 2,835,461.

Canadian Office Action dated Feb. 24, 2017 for the corresponding Canadian application No. 2,835,461.

* cited by examiner

DEVICE FOR MICROSCOPIC EXAMINATION

CROSS REFERENCE TO RELATED APPLICATIONS

This application is based on and incorporates herein by reference German Patent Application No. 10 2012 111 528.1 filed on Nov. 28, 2012.

PRIOR ART

The invention relates to a device for microscopic examination comprising an image output unit, at least two image input units, which are arranged in a spatially distributed manner and which have different sample receiving regions, at least one object carrier unit which supports at least one sample, in particular at least one biological sample, and comprising a coupling unit, which couples the image output unit and one of the at least two image input units optically to form a microscope unit.

Conventional microscopes, in particular light microscopes, have an image generating unit for generating a magnified image, said image generating unit consisting of objective elements, in particular objective lenses, arranged in a microscope tube, and ocular elements, in particular ocular lenses. The microscope tube of the microscope requires a large amount of space in a defined direction, thereby making it more difficult to install the microscope under confined conditions. Furthermore, when the microscope is used for samples supported on centrifuges, for example on board a space capsule, space station or satellite situated in space, it is necessary to construct the entire microscope together with the microscope tube on the centrifuge, as a result of which, on account of a rotation of the centrifuge, a high load on individual components of the microscope occurs and an experiment can be disturbed on account of an imbalance caused by movements of the microscope components.

The objective of the invention is, in particular, to provide a generic device for microscopic examination which can be used well even under confined conditions. The objective is achieved according to the invention by means of a device comprising the features of patent claim 1, while advantageous configurations and developments of the invention can be gathered from the dependent claims.

Advantages of the Invention

The invention is based on a device for microscopic examination comprising an image output unit, at least two image input units, which are arranged in a spatially distributed manner and which have different sample receiving regions, at least one object carrier unit which supports at least one sample, in particular at least one biological sample, and comprising a coupling unit, which couples the image output unit and one of the at least two image input units optically to form a microscope unit.

A "microscope unit" should be understood to mean, in particular, a unit which is provided for generating a magnified image of an object. Preferably, the microscope generates the magnified image of the object by means of a light beam, wherein the light beam can be received purely passively from the object or can be actively generated by the microscope. In particular, the microscope unit has components acting as lenses for generating a magnified image. In principle, the microscope unit can also generate a magnified image of an object by means of a particle beam, for example an electron or ion beam. An "image input unit" should be understood to mean, in particular, a unit which faces the object and which receives an image of the object which is transmitted to the image output unit via an image transmission path for magnification and viewing. The image input unit preferably has at least one objective lens or a magnetic field generating element acting as an objective lens for focusing a particle beam by means of which the image of the object is received. An "image transmission path" should be understood to mean, in particular, an optical path between two units, wherein elements for influencing a beam path, such as deflection elements, for example, can be arranged on the image transmission path. The image transmission path can be embodied in a rectilinear fashion or else in a non-rectilinear fashion by means of deflection elements. The fact that the image input units "have different sample receiving regions" should be understood to mean, in particular, that the image input units are aligned with different samples at an identical point in time and that different samples are viewed alternately by means of an optical coupling between image output unit and different image input units. In particular, at least two image input units having different sample receiving regions differ from an image input unit which is embodied as a standard revolving nosepiece unit and in which different objective lenses can be selected by means of a rotation. A "sample receiving region" should be understood to mean, in particular, a region in which an image input unit can view a sample, wherein the sample receiving region is given by an aperture angle of the image input unit and a pivoting and/or movement range of the image input unit.

An "image output unit" should be understood to mean, in particular, a unit which is arranged in the image transmission path from the object to an observer or an appliance for image storage such as, for example, a computer or a camera with a memory, between the image input unit and the observer or the appliance for image storage, and which makes available to the observer or to the appliance for image storage a magnified image of the object from the image communicated by the image input unit. In particular, the image output unit can have a camera or a monitor for the viewing of the image by the observer. In particular, the image output unit forms an interface between the observer and the microscope unit. The image input unit preferably has at least one ocular lens or a magnetic field generating element acting as an ocular lens for focusing a particle beam by means of which the magnified image of the object is generated from an image generated by the image input unit. The image input units and the image output unit are preferably embodied in a manner separated from one another in at least one operating state and free of a physical connection such as, for example, a mounting in a common housing. The fact that "the image output unit and one of the at least two input units are optically coupled to form a microscope unit" should be understood to mean, in particular, that the coupling unit is provided for aligning the image output unit and one of the at least two image input units with one another in a targeted manner for producing an optical connection, wherein the production of the optical connection is free of any production of a physical connection of the image output unit and the image input unit. In particular, the coupling unit couples the image output unit and the image input unit by means of a targeted alignment of the image output unit and/or the image input unit with an image directing element or a targeted alignment of the image directing element with the image output unit and the image input unit. In particular, the coupling unit couples the image output unit and different image input units to form a microscope unit in order to view alternately different samples, in particular in an otherwise stationary experimental set-up. An "image directing element" should be understood to mean, in particular, elements which can shape and direct a beam path, such as lenses, prisms and/or mirrors, for example. In particular, a microscope unit that can be arranged flexibly can be achieved since only the image input units are allocated to the object carrier units, but the image output unit can be arranged largely arbitrarily at a location with free space.

It is furthermore proposed that the microscope unit is embodied in a multipartite fashion in a mounted and aligned state. "Is embodied in a multipartite fashion in a mounted and aligned state" should be understood to mean, in particular, that the microscope, in a mounted state in which it can be operated on account on an optical coupling of the image output unit and an image input unit, has at least two physically unconnected subunits which are separated from one another and which merely have an optical connection to one another for the purpose of image transmission. In particular, one subunit, provided for picking up an image of an object, can be positioned near the object and a further subunit can be arranged at a separate location for the purpose of utilizing space as advantageously as possible. In particular, the subunit provided for picking up an image of an object is formed by an image input unit and a further subunit is formed by the image output unit. It is possible to achieve, in particular, a microscope which can be used flexibly and which can be arranged in a particularly advantageous, space-saving and simple manner in particular under confined conditions.

In one development of the invention it is proposed that at least one object carrier unit is embodied as a centrifuge. At least one sample is arranged fixedly on the centrifuge, such that it participates in a rotation of the centrifuge. The centrifuge is provided, in particular, for generating for the sample a gravitational force higher than 1 g or, under external conditions with a gravitational force lower than 1 g, a gravitational force in a range from the gravitational force lower than 1 g, by virtue of the centrifuge being operated at a standstill and merely functioning as a stationary bearing surface, to several g. It is possible to achieve, in particular, a flexible object carrier unit for observing a sample under different, adjustable conditions.

It is furthermore proposed that in at least one operating state, at least one of the image input units is coupled at least substantially rotationally to at least one allocated object carrier unit. "Coupled at least substantially rotationally to the at least one allocated object carrier unit" should be understood to mean, in particular, that the image input unit is likewise mounted rotatably, wherein the image input unit can be mounted rotatably together with the at least one sample on the at least one object carrier unit or is mounted on a separate rotatable unit which rotates at a rotational speed which deviates from a rotational speed of the object carrier unit maximally by five percent, advantageously maximally by two percent and preferably maximally by one percent, wherein a deviation is substantially governed by a control inaccuracy. In particular, the image input unit can be driven at the same rotational speed as the object carrier unit. It is possible to achieve, in particular, a displacement-free receiving of a rotating sample.

It is furthermore proposed that in the at least one operating state, the at least one image input unit rotates relative to the image output unit. In particular, the image output unit is static, while the image input unit is rotationally coupled to an allocated object carrier unit. It is possible to avoid, in particular, a mechanical load on the image output unit, in particular on supplementary appliances of the image output unit such as laser light sources for generating a fluorescence signal of the sample, in particular as a result of vibrations on account of concomitant rotation of the image output unit.

It is furthermore proposed that the device has at least one derotator unit arranged in a beam path between the at least one image input unit and the image output unit. A "derotator unit" should be understood to mean, in particular, a unit which is provided for converting an image that rotates on account of a rotation of the image input unit relative to the image output unit into a stationary image, which is communicated to the image output unit. For this purpose, the derotator unit can be embodied as a unit with an image pick-up, which electronically processes the rotating image and communicates it in a derotated fashion to the image output unit, or as a unit with an optical elements, for example a prism, which is moved suitably in order to compensate for an angular change of the image on account of the rotation of the image input unit relative to the image output unit. It is possible to achieve, in particular, an image which can be observed in a simple manner without disturbing influences on account of a rotation.

Furthermore, at least one rotational speed halving unit by means of which the derotator unit rotates at least substantially at half a rotational speed of the at least one image input unit is proposed. In particular, the at least one image input unit is optically connected to the image output unit via a deflection element embodied as a mirror, such that, on account of angle of incidence and angle of reflection being identical, an angular change on account of a rotation of the image input unit and the at least one sample is doubled, and the derotator unit is embodied as a prism, such that the image is derotated on account of a rotation of the prism at half a rotational speed of the image input unit. It is possible to achieve, in particular, a derotator unit embodied in a structurally simple manner.

It is furthermore proposed that the image output unit is optically connected to the at least one image input unit via at least one deflection element. A "deflection element" should be understood to mean, in particular, an element that deflects a beam path of an image, preferably with as little loss of intensity as possible, such as a mirror or a prism, for example. It is possible to achieve in a structurally simple manner, in particular, a high flexibility of an arrangement of the image output unit relative to the image input units by virtue of an image transmission path being suitably set by means of the at least deflection element.

Furthermore, there is proposed at least one channel switching unit which is provided for switching the image output unit between different sample channels each of which is allocated to one sample. A "channel switching unit" should be understood to mean, in particular, a unit which causes the sample channels to be changed, for example by the image output unit being moved between different positions allocated to different sample channels, or by one sample channel from a plurality of sample channels being selected by means of a selection element such as a selection mirror, for example, and being optically connected to the image output unit, a previously viewed sample channel being superseded, or by a sample allocated to an image input unit optically coupled to the image output unit being replaced by a different sample, for example by an object carrier unit rotating relative to the image input unit. Preferably, a possibility of moving the image output unit between different positions is combined with a possibility of switching between a plurality of image input units allocated to a position and/or a possibility of switching a sample viewed by an image input unit by means of the channel switching unit. A "sample channel" should be understood to mean, in particular, a respective image transmission path from a specific sample to an optically coupled pair of an image input unit and an image output unit which form a microscope unit. It is possible to achieve, in particular, viewing of a plurality of samples with an individual image output unit, as a result of which a separate image output unit for further samples can be obviated.

It is furthermore proposed that the channel switching unit has at least one image output switching unit which is provided for moving or positioning the at least one image output unit between at least two working positions each of which is allocated to at least one sample channel. The image output switching unit is preferably embodied as a carrier unit for the image output unit, said carrier unit being movable or rotatable on a rail. It is possible to achieve, in particular, a channel switching unit embodied in a structurally simple manner.

It is furthermore proposed that the channel switching unit has at least one image input switching unit which is provided for switching at least one of the at least two image input units between a plurality of sample channels. The image input switching unit can have, for example, a movable, preferably rotatable, selection mirror, which selectively connects the image input switching unit to different samples, or can be embodied as a rotatable object carrier unit with a plurality of samples that are rotated alternately in front of the image input unit. It is possible to achieve, in particular, a channel switching unit embodied in a structurally simple manner.

It is furthermore proposed that the image input switching unit changes over the at least one of the at least two image input units by a rotational movement between a plurality of sample channels. The rotational movement for a changeover between a plurality of sample channels is preferably achieved by means of a rotational or pivoting movement of different samples relative to a static image input unit. In principle, the image input unit can also be rotated relative to statically supported samples and/or be aligned by a pivoting movement in order to achieve a changeover between a plurality of sample channels. It is possible to achieve, in particular, an image input switching unit embodied in a structurally simple manner.

It is furthermore proposed that the device has a multiple carrier structure, at which the channel switching unit, at least one image output unit and a plurality of object carrier units and allocated image input units are arranged. A "multiple carrier structure" should be understood to mean, in particular, a structure having a plurality of defined workstations for receiving local object carrier units with allocated image input units, wherein the workstations are embodied in such a way, for example by provision of viewing holes, that an optical coupling of the image input units to the image output unit is made possible. The multiple carrier structure can be embodied as a linear multiple carrier structure, for example as a table having a top side, at which a plurality of object carrier units embodied as centrifuges together with allocated rotationally coupled image input units are arranged, and having an underside, at which is arranged at a rail or guide with an image output unit movable on the rail or guide, wherein the table has, at or near positions of the image input units, viewing holes for conveying the image of the image input unit, which are made to coincide with corresponding viewing holes of the object carrier units, coupling units and/or image input units. The multiple carrier structure can also be embodied in forms deviating therefrom, for example as a ring-shaped structure having an inner side, at which the image output unit is arranged in a movable manner, and an outer side, at which object carrier units, image input units and samples are arranged. It is possible to achieve, in particular, a compact device construction that can be operated in a simple manner.

It is furthermore proposed that at least one of the object carrier unit is embodied as a multiple sample carrier unit at which a plurality of samples are arranged. It is possible to achieve, in particular, a reduction of a number of required image input units.

It is furthermore proposed that to each object carrier unit at least one separate image input unit is allocated. The object carrier units are preferably embodied as multiple sample carrier units. It is possible, in particular, to dispense with a movement of an image input unit between a plurality of object carrier units and thus to reduce an apparatus outlay.

It is furthermore proposed that the multiple carrier structure is embodied as a polygon structure. A "polygon structure" should be understood to mean, in particular, a multiple carrier structure having a polygonal shape, wherein object carrier units with allocated image input units are arranged on sides of the polygonal shape between corners of the polygonal shape and the image output unit is arranged in a center of the polygonal shape. The polygon structure is provided, in particular, for use under at least substantial weightlessness. It is possible to achieve, in particular, a space-saving multiple carrier structure.

It is furthermore proposed that to each sample a separate image input unit is allocated. In particular, a change between sample channels is achieved by rotation of a selection mirror which can optically connect the image input unit to the image output unit. It is possible to achieve, in particular, an observation of a plurality of samples with little apparatus outlay for the observation change.

It is furthermore proposed that the microscope unit is embodied as a fluorescence microscope unit. A "fluorescence microscope unit" should be understood to mean, in particular, a microscope unit which has at least one light source, preferably a laser light source, for irradiating the sample for generating a fluorescence signal of the sample and at least one filter element for filtering out light frequencies that deviate from light frequencies of the fluorescence signal. The fluorescence microscope unit can furthermore have further supplementary appliances, for example for carrying out STED or TIRF microscopy. The image input unit of the fluorescence microscope unit preferably has only one or a plurality of objective lenses. The image output unit has all further required elements such as laser light sources, filter elements and further supplementary appliances. In particular, by including more complicated and sensitive components of the fluorescence microscope unit in a stationary image output unit, it is possible to achieve a low mechanical loading of the more complicated components even during an observation of a rotating sample and also a reduced unbalance on a rotation device for rotating the sample. Furthermore, it is possible to achieve, in particular, a device having a particularly high resolution.

A use of a device according to any of the preceding claims under conditions of reduced gravitational force is furthermore proposed. "Conditions of reduced gravitational force" should be understood to mean, in particular, conditions under which a gravitational action of a maximum of 0.9 g, advantageously a maximum of $1*10^{-3}$ g, preferably a maximum of $1*10^{-6}$ g, and particularly preferably a maximum of $1*10^{-8}$ g, takes effect. The gravitational action can be produced by gravitation and/or artificially by an acceleration. "g" denotes the value of the acceleration of free fall on the earth of 9.81 m/s². It is possible to achieve, in particular, an observation of the sample and the behavior thereof which is free of gravitational force influences. Furthermore, particularly in interaction with an object carrier unit embodied as a centrifuge, it is possible to examine a sample under different, in particular changing, gravitational force conditions set by the driving of the centrifuge in a range from a gravitational force of less than 1 g through to hypergravitation with a gravitational force of several g.

DRAWINGS

Further advantages will become apparent from the following description of the drawings. The drawings illustrate three exemplary embodiments of the invention. The drawings, the description and the claims contain numerous features in combination. A person skilled in the art will expediently also consider the features individually and combine them to form expedient further combinations.

Figure 2:
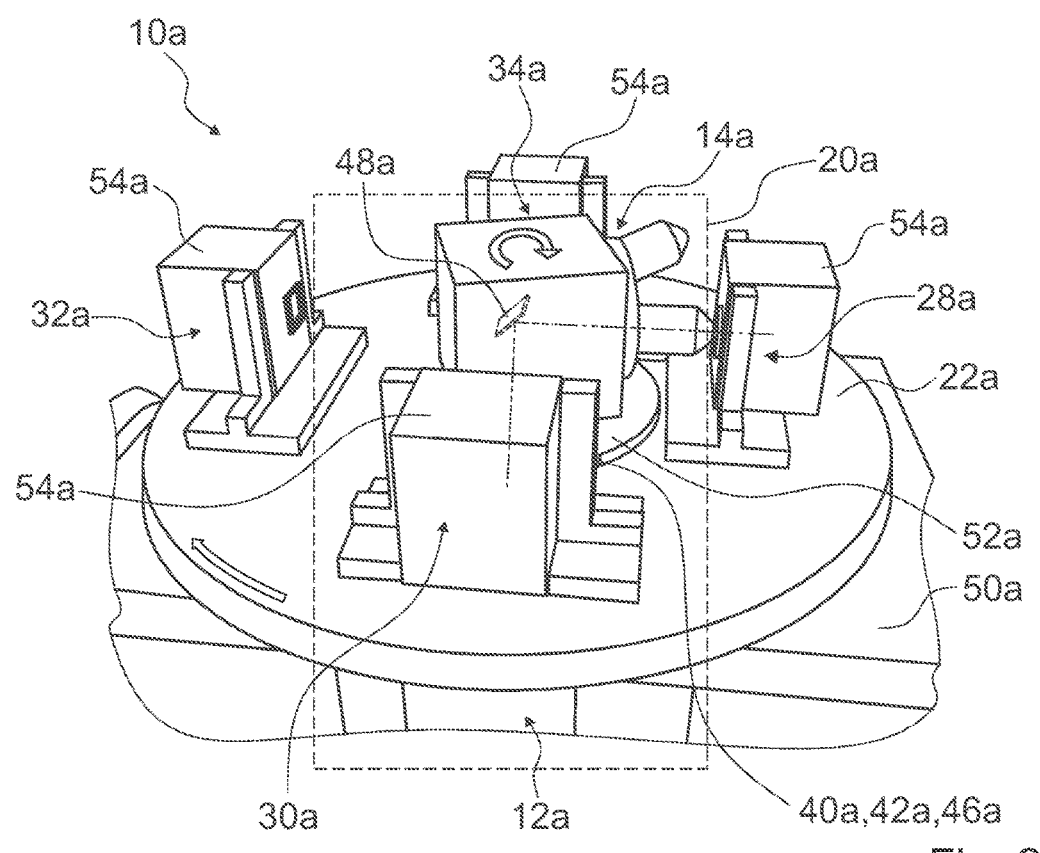
Figure 3:
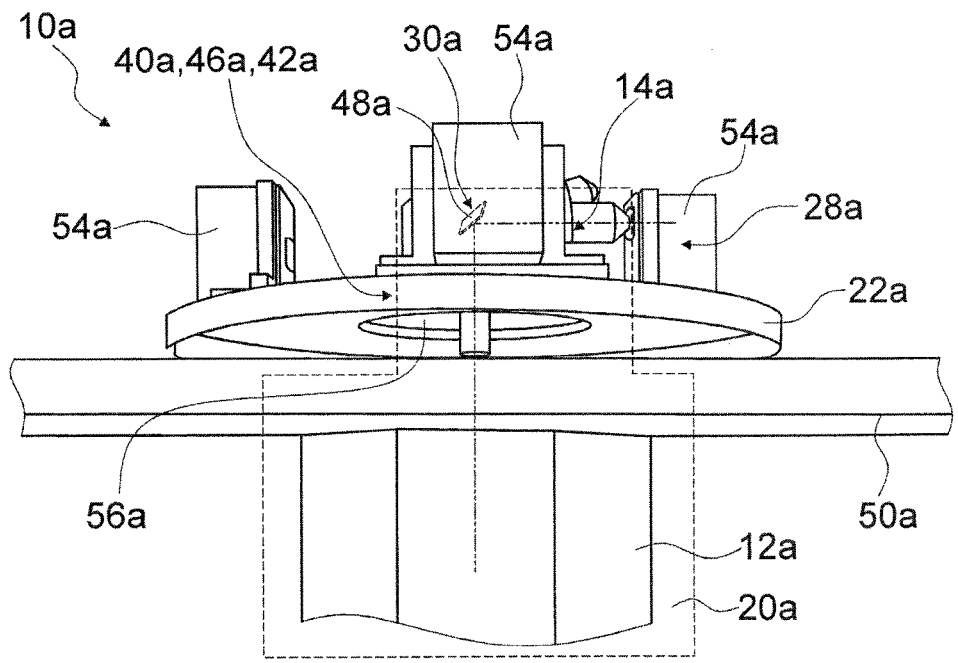
Figure 4:
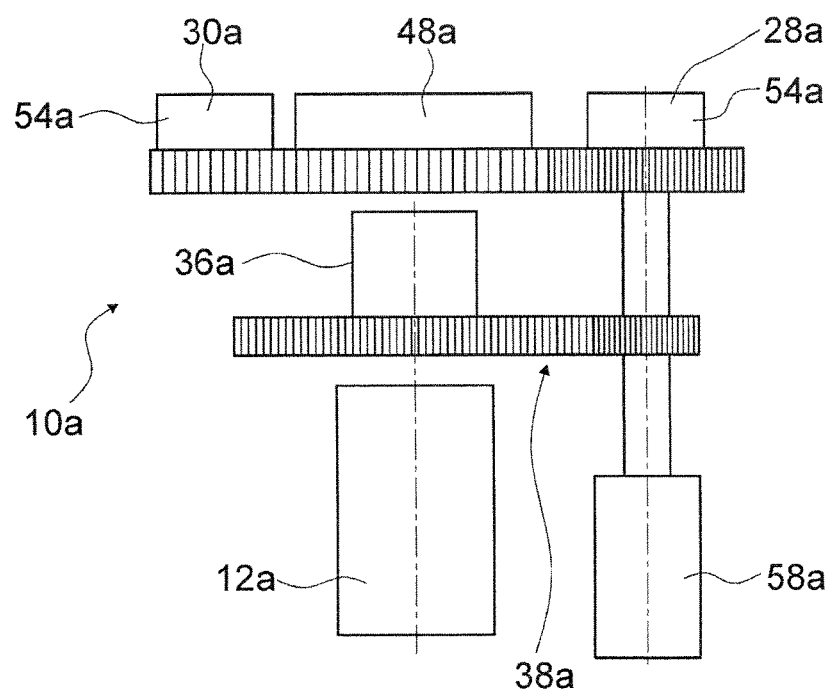
Figure 5:
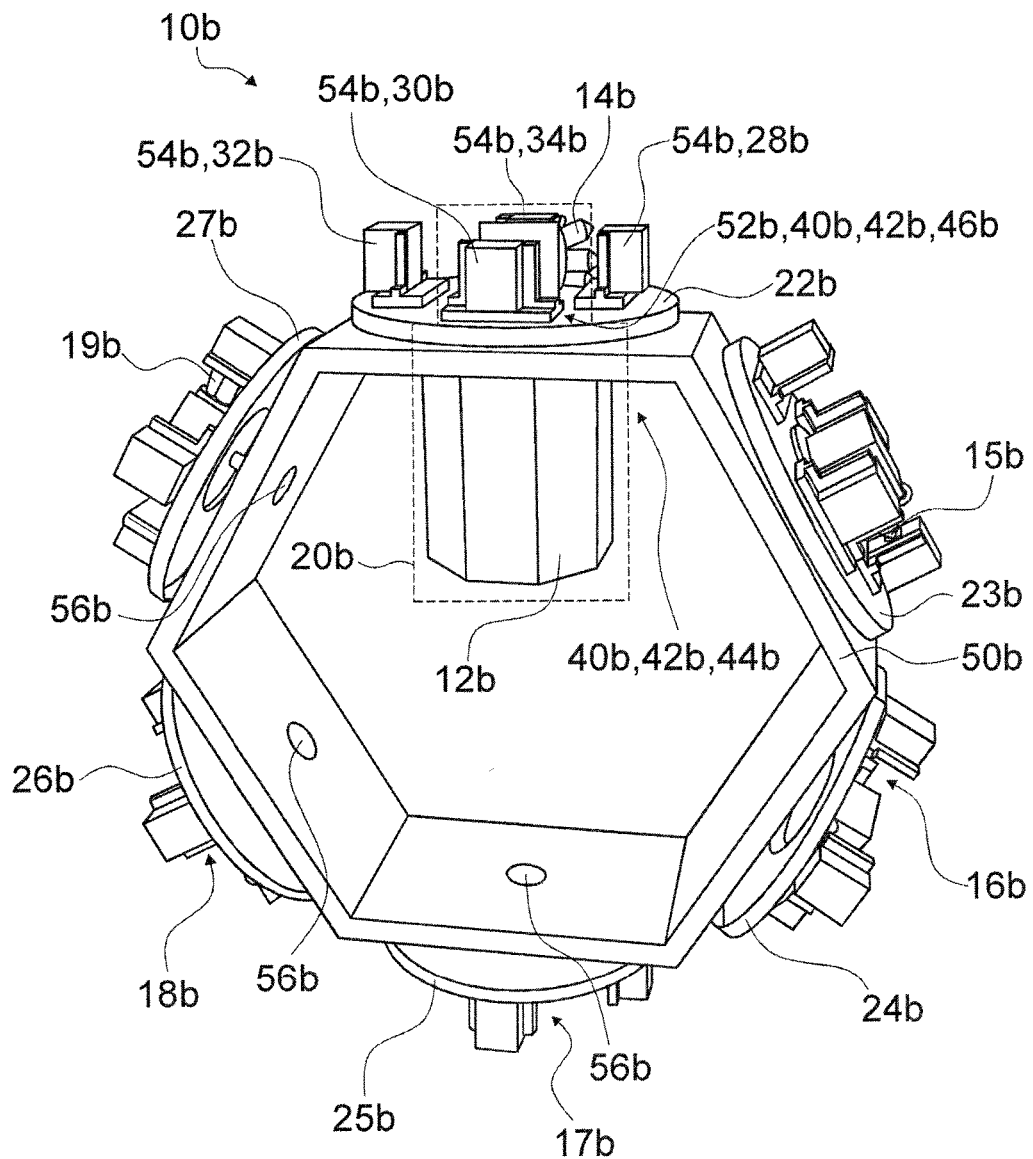
Figure 6:
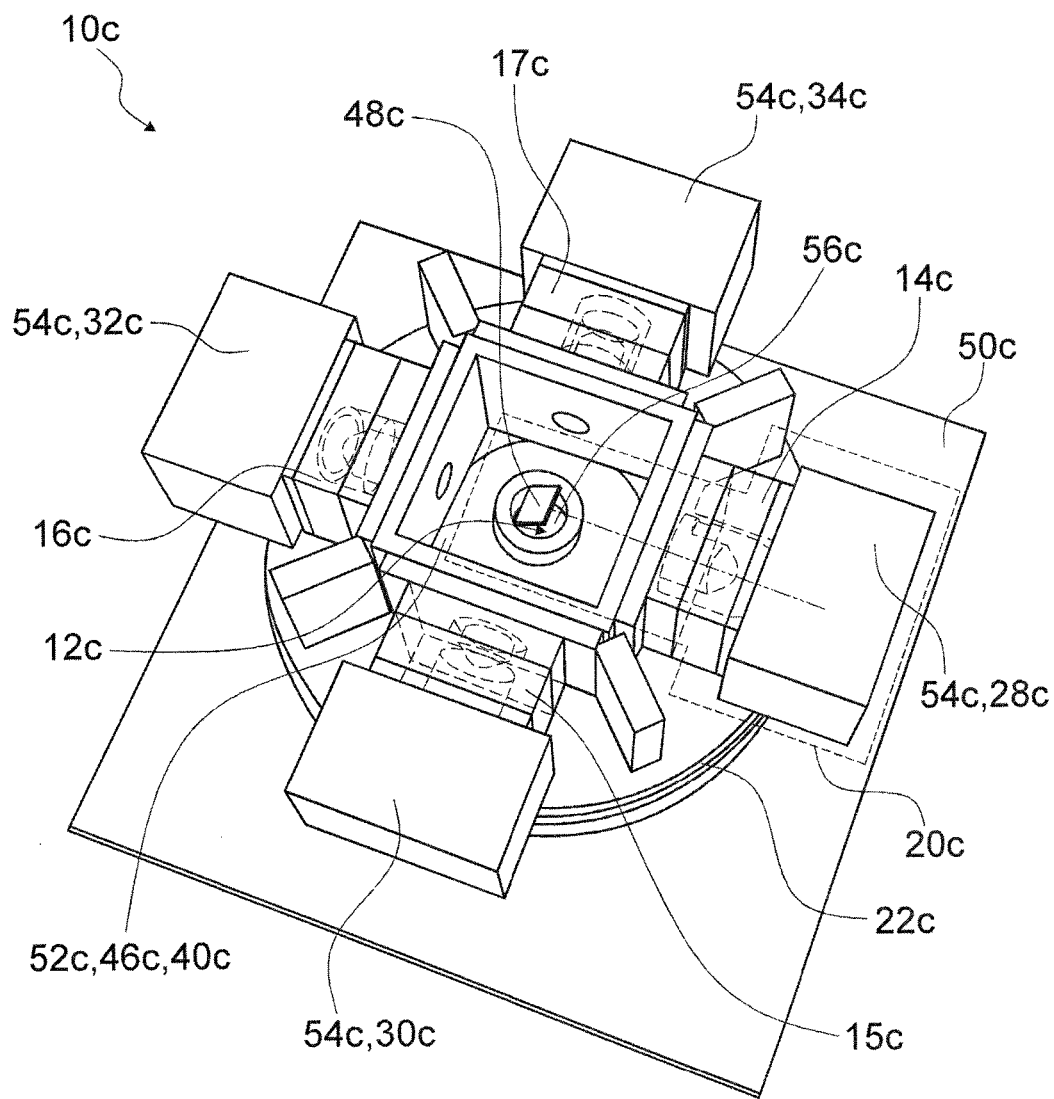

In the figures:

FIG. 1 shows a device according to the invention for microscopic examination comprising an image output unit, a plurality of multiple sample carrier units with allocated image input units and a coupling unit on a linear multiple carrier structure, FIG. 2 shows the device according to the invention with a detail view of an individual object carrier unit with image input unit, FIG. 3 shows a further detail view of an object carrier unit and an image input unit of the device according to the invention, FIG. 4 shows a schematic view of a derotator unit of the device for microscope examination according to the invention, FIG. 5 shows an alternative device comprising an alternative multiple carrier structure embodied as a polygon structure, and FIG. 6 shows a further alternative device for microscopic examination, in which each sample on an object carrier unit is allocated a separate image input unit and the coupling unit has a unit for rotating a deflection element.

DESCRIPTION OF THE EXEMPLARY EMBODIMENTS

FIG. 1 shows a device 10a for microscopic examination comprising an image output unit 12a, five image input units 14a, 15a, 16a, 17a, 18a which are arranged in a spatially distributed manner and which have different sample receiving regions, five object carrier units 22a, 23a, 24a, 25a, 26a which each support four samples 28a, 30a, 32a, 34a, formed by biological samples, and comprising a coupling unit 40a, which couples the image output unit 12a and one of the image input units 14a, 15a, 16a, 17a, 18a optically to form a microscope unit 20a. The image output unit 12a has an ocular lens for magnified imaging of an image of one of the samples 28a, 30a, 32a, 34a picked up by means of one of the image input units 14a, 15a, 16a, 17a, 18a, and also at least one laser light source for generating a fluorescence signal in a viewed sample 28a, 30a, 32a, 34a, filter elements for filtering out light frequencies outside a frequency range of the fluorescence signal, in particular for filtering out an excitation signal of the laser light source, and a camera with memory system for storing the magnified images of the samples 28a, 30a, 32a, 34a. The microscope unit 20a is thus embodied as a fluorescence microscope unit. The image input units 14a, 15a, 16a, 17a, 18a each have an revolving nosepiece with a plurality of objective lenses, which can be selected in a suitable manner, and are mounted onto a housing mounted rotatably on a rotary carrier unit 52a, wherein the rotary carrier unit 52a is laterally enclosed by the object carrier unit 22a, 23a, 24a, 25a, 26a. The object carrier units 22a, 23a, 24a, 25a, 26a are embodied as centrifuges, on each of which four samples 28a, 30a, 32a, 34a are arranged in a stationary manner in each case in a sample container 54a. The sample containers 54a are mounted on the object carrier units 22a, 23a, 24a, 25a, 26a in each case on a rail, allowing a linear one-dimensional displacement of the sample containers 54a in a small range in order to view different partial regions of one of the samples 28a, 30a, 32a, 34a.

In alternative configurations, the sample containers can also be arranged in a two- or three-dimensionally movable manner on the object carrier units 22a, 23a, 24a, 25a, 26a in order to view different partial regions of a sample 28a, 30a, 32a, 34a by changes of position in two or three dimensions. The sample containers 54a have a viewing window with a glass sheet for viewing the samples 28a, 30a, 32a, 34a. The object carrier units 22a, 23a, 24a, 25a, 26a are thus embodied as multiple sample carrier units at which a plurality of samples 28a, 30a, 32a, 34a are arranged. In an alternative embodiment, it is also possible to arrange in each case one sample 28a, 30a, 32a, 34a on one of the object carrier units 22a, 23a, 24a, 25a, 26a. In at least one operating state, one of the image input units 14a, 15a, 16a, 17a, 18a is coupled at least substantially rotationally to at least one allocated object carrier unit 22a, 23a, 24a, 25a, 26a, which is brought about by driving of the rotary carrier unit 52a of the image input unit 14a, 15a, 16a, 17a, 18a and of the allocated object carrier unit 22a, 23a, 24a, 25a, 26a to rotate at an identical angular velocity. Each object carrier unit 22a, 23a, 24a, 25a, 26a is allocated a separate image input unit 14a, 15a, 16a, 17a, 18a.

The image output unit 12a is optically connected to the image input unit 14a via a deflection element 48a in the example shown (FIG. 2) and this coupled to one microscope unit 20a. The image output unit 12a is optically connected to the image input unit 14a in a manner free of a physical connection (FIG. 3) and the microscope unit 20a is thus embodied in a multipartite fashion in a mounted and aligned state. The coupling unit 40a, which couples the image output unit 12a to one of the image input units 14a, 15a, 16a, 17a, 18a optically to form a microscope unit 20a, is formed by a unit for moving the image output unit 12a at an underside of a table along a rail or guide. On a top side of the table, which forms a multiple carrier structure 50a, at which a channel switching unit 42a, a image output unit 12a and a plurality of object carrier units 22a, 23a, 24a, 25a, 26a and the allocated image input units 14a, 15a, 16a, 17a, 18a are arranged, the object carrier units 22a, 23a, 24a, 25a, 26a and allocated image input units 14a, 15a, 16a, 17a, 18a are arranged. Viewing holes 56a in the table and corresponding holes in the object carrier units 22a, 23a, 24a, 25a, 26a which are embodied as centrifuges, allow the image to pass from the image input units 14a, 15a, 16a, 17a, 18a to the image output unit 12a. As a result of a movement of the image output unit 12a at different working positions in which a beam path via the deflection element 48a, which is arranged within the housing on the rotary carrier unit 52a, the image output unit 12a and one of the image input units 14a, 15a, 16a, 17a, 18a, an optical coupling to form a microscope unit 20a is achieved.

A channel switching unit 42 of the device 10a for microscopic examination is provided for switching the image output unit 12a between different sample channels which are respectively allocated to a sample 28a, 30a, 32a, 34a. The channel switching unit 42a has an image output switching unit 44a, which is provided for moving or positioning the one image output unit 12a between the working positions respectively allocated to at least one sample channel. The image output switching unit 44a is formed by the unit for moving the image output unit 12a along the rail or guide at the underside of the multiple carrier structure 50a. A sample channel is an image transmission channel from a specific sample 28a, 30a, 32a, 34a via one of the image input units 14a, 15a, 16a, 17a, 18a and a deflection element 48a to the image output unit 12a, by means of which the specific sample 28a, 30a, 32a, 34a can be microscopically examined. Each working position is allocated a plurality of sample channels, in this example four sample channels, since in this example in each case four samples 28a, 30a, 32a, 34a are arranged on each object carrier unit 22a, 23a, 24a, 25a, 26a. For selecting one of the four sample channels of a selected working position, the channel switching unit 42a has, for each of the object carrier units 22a, 23a, 24a, 25a, 26a, an image input switching unit 46a, which is provided for switching the image input unit 14a, 15a, 16a, 17a, 18a respectively allocated to the object carrier unit 22a, 23a, 24a, 25a, 26a between a plurality of sample channels. The image input switching unit 46a is formed in each case by the rotary carrier unit 52a, which changes over the respective image input unit 14a, 15a, 16a, 17a, 18a between a plurality of sample channels by means of a rotational movement formed by a pivoting movement by means of the rotary carrier unit 52a being moved relative to the object carrier unit 22a, 23a, 24a, 25a, 26a in such a way that the image input unit 14a, 15a, 16a, 17a, 18a respectively allocated to the object carrier unit 22a, 23a, 24a, 25a, 26a faces a different one of the samples 28a, 30a, 32a, 34a.

The object carrier units 22a, 23a, 24a, 25a, 26a embodied as centrifuges are caused to rotate during operation in order to simulate different gravitational force conditions for the samples 28a, 30a, 32a, 34a. In the at least one operating state in which the image input units 14a, 15a, 16a, 17a, 18a is coupled at least substantially rotationally to at least one allocated object carrier unit 22a, 23a, 24a, 25a, 26a and the allocated object carrier unit 22a, 23a, 24a, 25a, 26a rotates, the allocated image input unit 14a, 15a, 16a, 17a, 18a rotates relative to the image output unit 12a. In order to avoid a rotation of the image of the image output unit 12a on account of the rotation of the image input unit 14a, 15a, 16a, 17a, 18a relative to the image output unit 12a and to obtain a stationary image, a derotator unit 36a is arranged in a beam path between the image input unit 14a, 15a, 16a, 17a, 18a and the image output unit 12a (FIG. 4). In a manner known in principle, by means of a rotational speed halving unit 38a, the derotator unit 36a is rotated at least substantially at half a rotational speed of the image input unit 14a, 15a, 16a, 17a, 18a in order to obtain a stationary image. For this purpose, in a manner known in principle, the derotator unit 36a has a prism, preferably embodied as a Dove prism. In the Dove prism, in a known manner, after a light beam enters into the prism, total internal reflection of the light beam takes place within the prism. An image transmitted via the light beam can furthermore be rotated by double the angular change by rotation of the Dove prism about a longitudinal axis. After an image has passed through the Dove prism, the image is represented in an inverted fashion. On account of a beam path within the prism of the derotator unit 36a and a rotation of the derotator unit 36a at half the rotational speed of the image input unit 14a, 15a, 16a, 17a, 18a about a longitudinal axis of the derotator unit 36a, the image rotating at double the angular velocity of the object carrier unit 22a, 23a, 24a, 25a, 26a on account of the deflection element 48a is converted into a stationary image. An inversion of the image can be electronically corrected in the image output unit 12a with a representation on a camera and/or a monitor or can be optically corrected by means of a further Dove prism. In alternative configurations of the invention, an Abbe-Koenig prism, a Schmidt-Pechan prism or an Uppendahl prism can also be used instead of a Dove prism in the derotator unit 36a. The rotational speed halving unit 38a is formed by a reduction gear mechanism which is mechanically coupled to the object carrier unit 22a, 23a, 24a, 25a, 26a and in this way brings about a rotation at half a rotational speed of the image input unit 14a, 15a, 16a, 17a, 18a, which is in turn coupled rotationally to the object carrier unit 22a, 23a, 24a, 25a, 26a. Alternatively, the rotational speed halving unit 38a can also be formed by a control unit which is controlled by a control unit of the object carrier unit 22a, 23a, 24a, 25a, 26a at half a rotational speed of the object carrier unit 22a, 23a, 24a, 25a, 26a. The object carrier unit 22a is driven by a centrifuge motor 58a.

The device 10a for microscopic examination according to the invention is provided for use under conditions of reduced gravitational force with a gravitational action of a maximum of 0.9 g, for example on board a space capsule, space station or rocket in space or on an asteroid, moon or planet other than Earth. In particular, under conditions of reduced gravitational force, preferably under weightlessness, by means of the object carrier units 22a, 23a, 24a, 25a, 26a embodied as centrifuges, it is possible to set a gravitational force range between the reduced gravitational force and a hypergravitation of g and thus to cover a large experimental range. The device 10a for microscopic examination according to the invention can also be used on Earth, in which case a gravitational force of greater than 1 g can be simulated by means of the object carrier units 22a, 23a, 24a, 25a, 26a embodied as centrifuges.

FIGS. 5 and 6 show two further exemplary embodiments of the invention. The following descriptions and the drawings are substantially limited to the differences between the exemplary embodiments, wherein with regard to identically designated components, in particular with regard to components having identical reference signs, reference is also made, in principle, to the drawings and/or the description of the other exemplary embodiments, in particular FIGS. 1 to 4. In order to distinguish between the exemplary embodiments, the letter a is attached to the reference signs of the exemplary embodiment in FIGS. 1 to 4. In the exemplary embodiments in FIGS. 5 and 6, the letter a is replaced by the letters b to c.

FIG. 5 shows an alternative device 10b for microscopic examination, in which a multiple carrier structure 50b is embodied as a polygon structure. The polygon structure is embodied as a hexagon having six corners and six side faces, wherein on a top side of the polygon structure facing away from a center, an object carrier unit 22b, 23b, 24b, 25b, 26b, 27b embodied as a centrifuge is in each case arranged on the side faces. Furthermore, an image input unit 14b, 15b, 16b, 17b, 18b, 19b is arranged on each of the object carrier units 22b, 23b, 24b, 25b, 26b, 27b. At an underside, an image output unit 12b is arranged in the center in a movable manner. A unit for moving the image output unit 12b at the underside of the multiple carrier structure 50b forms, in a known manner, an image output switching unit 44b of a channel switching unit 42*b* and, in interaction with a deflection element 48*b*, a coupling unit 40*b*. Alternatively, the multiple carrier structure 50*b* embodied as a polygon structure can be pivoted around the image output unit 12*b* for the purpose of switching the sample channels, wherein in this case a unit for pivoting the polygon structure forms an image output switching unit 44*b*.

FIG. 6 partially illustrates a further alternative device 10*c* for microscopic examination, in which each sample 28*c*, 30*c*, 32*c*, 34*c* on an object carrier unit 22*c* is respectively allocated a separate image input unit 14*c*, 15*c*, 16*c*, 17*c*. The alternative device 10*c* is otherwise embodied totally analogously to the previous exemplary embodiments.

REFERENCE NUMERALS

10 Device for microscopic examination
12 Image output unit
14 Image input unit
15 Image input unit
16 Image input unit
17 Image input unit
18 Image input unit
19 Image input unit
20 Microscope unit
22 Object carrier unit
23 Object carrier unit
24 Object carrier unit
25 Object carrier unit
26 Object carrier unit
27 Object carrier unit
28 Sample
30 Sample
32 Sample
34 Sample
36 Derotator unit
38 Rotational speed halving unit
40 Coupling unit
42 Channel switching unit
44 Image output switching unit
46 Image input switching unit
48 Deflection element
50 Multiple carrier structure
52 Rotary carrier unit
54 Sample container
56 Viewing hole
58 Centrifuge motor

The invention claimed is:

1. A device for microscopic examination, comprising: an image output unit having a camera; a multiple carrier structure; a first object carrier unit, mounted to the multiple carrier structure, including a primary first sample container attached to the first object carrier unit, configured to support a primary first sample in a stationary manner in the first sample container, and a second object carrier unit, mounted to the multiple carrier structure, including a secondary first sample container attached to the second object carrier unit, configured to support a secondary first sample in a stationary manner in the secondary first sample container; a first image input unit, which is mounted at least substantially rotationally to the first allocated object carrier unit; a second image input unit, which is mounted at least substantially rotationally to the second allocated object carrier unit; a coupling unit coupler configured to selectively optically couple the image output unit and one of the first and second image input units to form a microscope unit; at least one deflection element deflector configured to deflect a beam path of an image, whereby the deflection element deflector sets an image transmission path that contains a change of direction, which enables the optical coupling; and at least one derotator unit arranged in a beam path between at least one of the first and second image input units and the image output unit, wherein the first and second object carrier units are embodied as centrifuges, the image output unit is static, while the image input unit is rotationally coupled to an allocated object carrier unit, and has an ocular lens configured to magnify an image of one of the samples picked up by one of the first and second image input units, and the first and second image input units are configured to rotate relative to the whole image output unit at the same rotational speed as the respective first and second object carrier units.

2. The device according to claim 1, wherein the microscope unit is embodied in a multipartite fashion in a mounted and aligned state.

3. The device according to claim 1, comprising at least one speed halving rotator by means of which the derotator rotates at least substantially at half a rotational speed of the at least one image input unit.

4. The device according to claim 1, comprising at least one channel switch which is provided for switching the image output unit between different sample channels each of which is allocated to one sample.

5. The device according to claim 4, wherein the channel switch has at least one image output switch which is provided for moving or positioning the at least one image output unit between at least two working positions each of which is allocated to at least one sample channel.

6. The device according to claim 4, wherein the channel switch has at least one image input switch which is provided for switching at least one of the first and second image input units between a plurality of sample channels.

7. The device according to claim 6, wherein the image input switch changes over the at least one of the first and second image input units by a rotational movement between a plurality of sample channels.

8. The device at least according to claim 4, comprising the multiple carrier structure, at which the channel switch, the image output unit and the first and second object carrier units and respective first and second image input units are arranged.

9. The device according to claim 8, wherein at least one of the first and second object carrier units is embodied as a multiple sample carrier unit at which a plurality of samples is arranged.

10. The device at least according to claim 8, wherein the multiple carrier structure is embodied as a polygon structure, whereas the two object carrier units are mounted on two side faces of the polygon structure.

11. The device according to claim 1, wherein to each sample a separate image input unit is allocated.

12. The device according to claim 1, wherein the microscope unit is embodied as a fluorescence microscope unit.

13. A method of using the device according to claim 1 under conditions of reduced gravitational force.

14. A device for microscopic examination comprising
an image output unit having a camera,
a multiple carrier structure,
at least two object carrier units, mounted to the multiple carrier structure, which support at least one sample, in particular at least one biological sample, and comprising,
at least two image input units, which are mounted at least substantially rotationally to the first allocated object carrier unit and the second allocated object carrier unit, which are arranged in a spatially distributed manner and which are associated with different sample containers, a coupler, which couples the image output unit and one of the at least two image input units optically to form a microscope unit, wherein the image output unit is optically connected to the at least one image input unit via at least one deflector that deflects a beam path of an image, whereby the deflector sets an image transmission path that contains a change of direction, wherein the at least one object carrier unit is embodied as a centrifuge, wherein at least one of the image input units is mounted at least substantially rotationally to the at least one allocated object carrier unit, which supports the at least one of the different sample containers in a stationary manner, and rotates relative to the whole image output unit, wherein the image output unit is static, while the at least one image input unit is rotationally coupled to the at least one allocated object carrier unit and wherein the image output unit is optically connected to the at least one image input unit via at least one deflector, and wherein the image transmission path is embodied in a non-rectilinear fashion by means of a deflector.

15. The device according to claim 1,
wherein the first image input unit is mounted onto a housing mounted rotatably on a rotary carrier, wherein the rotary carrier is laterally enclosed by the first object carrier unit.

16. The device according to claim 1,
wherein the first and second image input units each has a revolving nosepiece with a plurality of objective lenses, which can be selected in a suitable manner.

17. A device for microscopic examination comprising
an image output unit having a camera,
a multiple carrier structure,
at least two object carrier units, mounted to the multiple carrier structure, which support at least one sample, in particular at least one biological sample, in a stationary manner,
at least two image input units, which are mounted at least substantially rotationally to the first allocated object carrier unit and the second allocated object carrier unit, which are arranged in a spatially distributed manner and which are associated with different sample containers,
at least one channel switch which is provided for switching the image output unit between different sample channels each of which is allocated to one sample,
wherein the object carrier unit comprises a coupler, which couples the image output unit and one of the at least two image input units optically to form a microscope unit,
wherein the image output unit is optically connected to the at least one image input unit via at least one deflector that deflects a beam path of an image, whereby the deflector sets an image transmission path that contains a change of direction,
wherein the at least one object carrier unit is embodied as a centrifuge,
wherein at least one derotator is arranged in a beam path between at least one image input unit and the image output unit,
wherein at least one of the image input units is mounted at least substantially rotationally to at least one allocated object carrier unit, which supports the at least one of the different sample containers in a stationary manner, and rotates relative to the whole image output unit at the same rotational speed as the object carrier unit,
wherein the image output unit is static and
wherein the image output unit has an ocular lens for magnified imaging of an image of one of the samples picked up by means of one of the image input units.

18. A device for microscopic examination comprising
an image output unit having a camera,
a multiple carrier structure,
at least two object carrier units, mounted to the multiple carrier structure, which support at least one sample, in particular at least one biological sample, in a stationary manner,
at least two image input units, which are mounted at least substantially rotationally to the first allocated object carrier unit and the second allocated object carrier unit, which are arranged in a spatially distributed manner and which are associated with different sample containers,
at least one channel switch which is provided for switching the image output unit between different sample channels each of which is allocated to one sample,
wherein the channel switch has, for each of the object carrier units, an image input switch, which is provided for switching the image input unit, which is allocated to the respective object carrier unit, between a plurality of sample channels,
wherein the object carrier unit comprises a coupler, which couples the image output unit and one of the at least two image input units optically to form a microscope unit,
wherein the image output unit is optically connected to the at least one image input unit via at least one deflector that deflects a beam path of an image, whereby the deflector sets an image transmission path that contains a change of direction,
wherein the at least one object carrier unit is embodied as a centrifuge,
wherein at least one derotator is arranged in a beam path between at least one image input unit and the image output unit,
wherein at least one of the image input units is mounted at least substantially rotationally to at least one allocated object carrier unit, which supports the at least one of the different sample containers in a stationary manner, and rotates relative to the whole image output unit at the same rotational speed as the object carrier unit,
wherein the image output unit is static and
wherein the image output unit has an ocular lens for magnified imaging of an image of one of the samples picked up by means of one of the image input units.

19. The device according to claim 1, further comprising
at least third and fourth object carrier units mounted to the multiple carrier structure,
wherein
each of the third and fourth object carrier units is separately embodied as a centrifuge.

* * * * *